Figure 5:
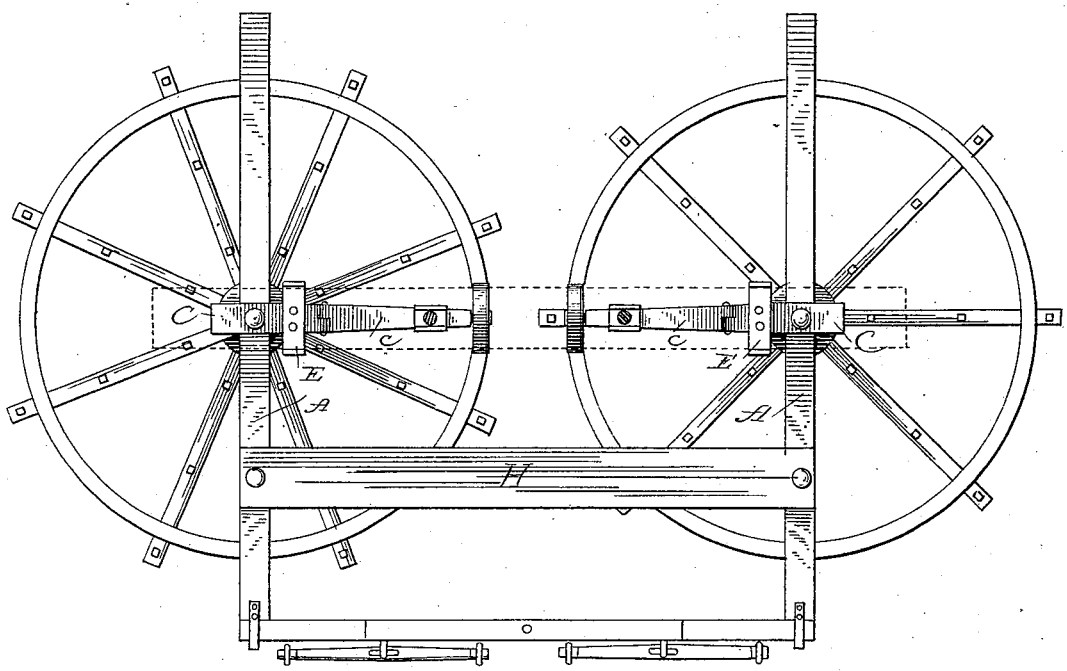

(No Model.) 3 Sheets—Sheet 1.
H. H. MONROE.
ROTARY HARROW.
No. 312,150. Patented Feb. 10, 1885.
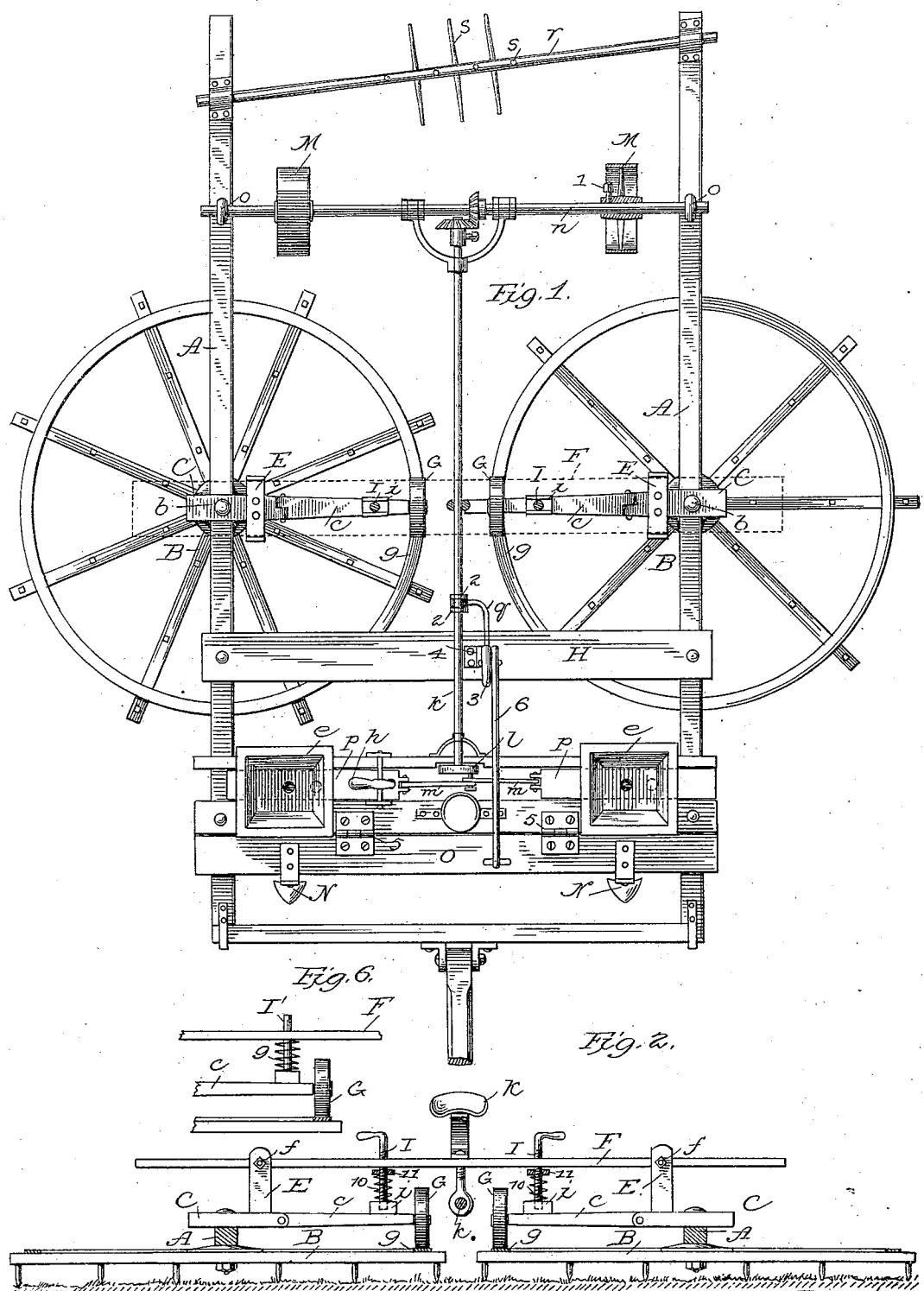

(No Model.)   3 Sheets—Sheet 2.
H. H. MONROE.
ROTARY HARROW.
No. 312,150.   Patented Feb. 10, 1885.
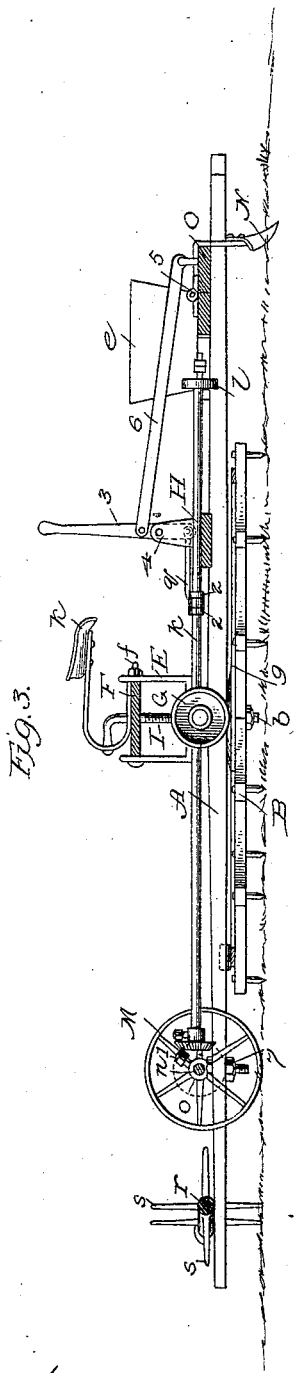
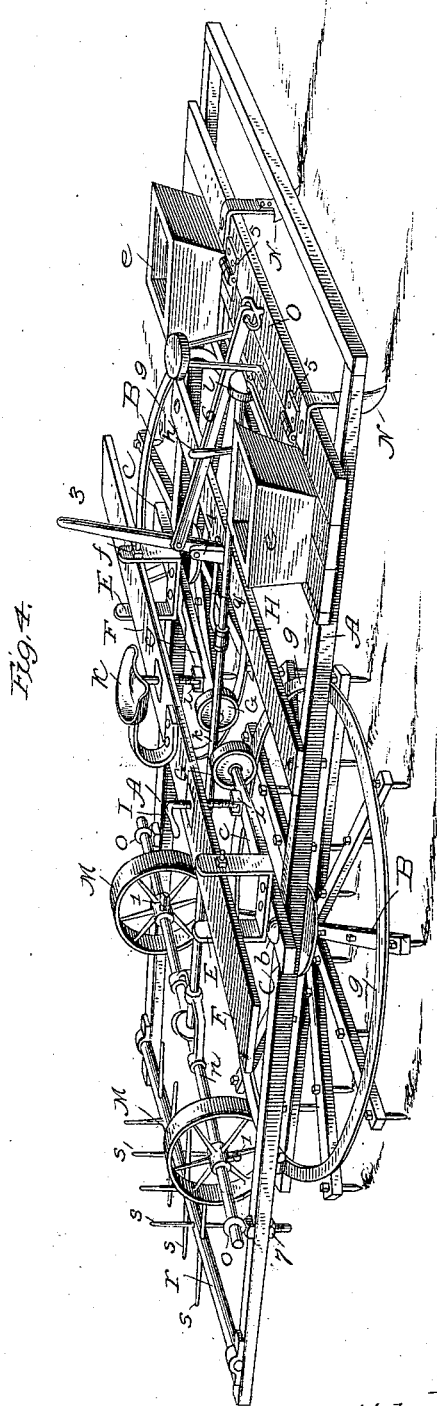
Attest:
Inventor
Halsey H. Monroe (No Model.)  H. H. MONROE.  3 Sheets—Sheet 3.
ROTARY HARROW.

No. 312,150.  Patented Feb. 10, 1885.

WITNESSES:
Walter Donaldson
F. L. Middleton.

INVENTOR
Halsey H. Monroe
BY Joyce & Spear
ATTORNEY

UNITED STATES PATENT OFFICE.

HALSEY H. MONROE, OF THOMASTON, MAINE.

ROTARY HARROW.

SPECIFICATION forming part of Letters Patent No. 312,150, dated February 10, 1885.

Application filed September 13, 1884. (No model.)

*To all whom it may concern:*

Be it known that I, HALSEY H. MONROE, of Thomaston, in the county of Knox and State of Maine, have invented a new and useful Improvement in Rotary Harrows; and I do hereby declare that the following is a full, clear, and exact description of the same.

My invention relates to rotary harrows, and is an improvement upon the form of harrow shown in Letters Patent of the United States granted me on the 12th day of September, 1882.

The object of my invention is, first, to improve the frame-work of the apparatus, and to adapt a double harrow of the general construction shown in my said patent to operate upon or between two rows of corn, either for covering the seed or for cultivating between the rows.

In the second place, my object is to combine a seed-dropper with the double rotary harrow, whereby the rotary harrow may be made to cover the seed and work in straight lines for that purpose.

Thirdly, my invention relates to the general construction and arrangement of the parts, whereby, with certain interchangeable pieces, the apparatus may be used either as a planter or cultivator.

Fourthly, my invention relates to an improved means for bracing and constructing the frame, whereby the wheels are made to bear constantly upon the harrows when the machine is in operation, and the harrows are also held against undue tipping toward the center.

The construction and combinations which I have devised for carrying out my invention are fully and particularly set forth hereinafter, and are represented in the accompanying drawings, in which—

Figure 1 represents a plan view of the apparatus adapted as a seeder, the seat being removed. Fig. 2 shows an end elevation of part of the same apparatus. Fig. 3 is a side elevation, and Fig. 4 a perspective view, of the same apparatus. Fig. 5 represents in plan the frame used when the machine is adapted to act as a cultivator. Fig. 6 shows a modification.

In these drawings, A A represent the sides of the main frame, on which are pivoted by king-bolts the rotary harrows B B.

The sides and harrows are substantially the same as those shown in my patent above mentioned, and operated substantially in the same manner.

The general construction of the frame is the same as in that patent, and the points in which it differs therefrom are hereinafter fully explained.

The king-bolts marked $b$ $b$ pass through arms C, and through the side pieces, A, which serve to raise the structure above the hub of the harrow. Upon these arms C are mounted brackets E, which brackets support the bracing and supporting bar or frame F. This bar or frame is connected to the brackets by bolts $f$, holding it firmly against lateral movement on the brackets.

To the inner ends of the arms C are pivoted supplemental arms $c$, on which are journaled bearing-wheels G, which wheels, as in the aforesaid patent, bear upon a circular track, $g$, on the upper surface of the harrows.

Through the frame F are inserted, in threaded holes, hand-screws I, the lower ends of which bear upon the bottom of grooves in blocks $i$, these blocks being grooved to allow the slight lateral motion necessary to the screws I I. By means of these screws, which may be reached by the driver from his seat, any desired amount of pressure can be applied to the harrow upon the sides directly under the driver's seat. The seat is shown at K. The position of the seat brings the weight of the driver over the center, and tends, as far as the rigidity of the frame F will permit, to press through the screws upon the wheels G G; but the weight of the driver is not necessary for this purpose, as the screws I I are of themselves sufficient to give all the pressure needed to cause the harrows to turn.

It will be observed that the harrows B B are arranged to leave a space between them, and that the construction is such that the framework is elevated above the ground, and a space left sufficiently large, vertically as well as laterally, to allow the harrow to pass over cornrows, even if the corn has attained considerable height; and by means of this construction the harrow can be used as a cultivator, as well as a planter, or for the ordinary purpose of a harrow, at the pleasure of the operator.

In harrows of this class there is a tendency to throw out the teeth on the outer sides by undue tipping of the circular harrows. This tendency is obviated by means of the construction described, and shown more clearly in Fig. 2. The frame F serves to brace the two circular harrows on a line at considerable height above the teeth. Obviously it prevents the tops of the standards E E from approaching each other.

As the supplemental arms $c$ $c$, which carry the wheels G, are pivoted to the arms C and form no part of the rigid structure, their motion or action does not interfere with the rigidity of the main frame-work. The side pieces, A A, are connected and the frame-work stiffened by a broad cross-bar or foot-board, H. In front of this, and upon the side pieces, is arranged a seed-dropping apparatus. (Shown in Figs. 1, 3, and 4.) The boxes are indicated at $e$, and underneath these boxes is a reciprocating sliding valve, $p$, which may be worked by a handle, $h$, or by means of a shaft, $k$. This shaft has a face-plate, $l$, and a wrist-pin connected to the slide-valves by means of rods $m$ $m$. The shaft $k$ extends to the rear, being supported in suitable bearings, and by means of beveled gears is connected to a shaft or axle, $n$, which is mounted in vertically-adjustable bearings $o$ on the side pieces to regulate the depth of the work. Upon this axle are set broad-tread wheels M, adapted to bear upon the ground and partially support the apparatus. By means of the set-screw $l$ they may be adjusted to and fixed at any point on the shaft. This enables the operator to set them in line with the seed-droppers, so as to press the earth over the seed, if desired; otherwise they may be shifted out of that line, either outwardly or inwardly. Thus they serve the double purpose of supporting the apparatus and pressing the earth over the seed when necessary. The shaft $k$ is arranged in its bearings so that it may be shifted longitudinally to throw the beveled gears connected to the axle $n$ into or out of mesh, the rods $m$ $m$ having lateral play sufficient for that purpose. This movement is effected by means of a gooseneck, $q$, having an eye, through which the shaft passes, held by collars 2 2, fixed on the shaft. The goose-neck $q$ is connected to a hand-lever, 3, which is pivoted to a standard, 4, set on the cross or foot bar H, the goose-neck being pivoted below the pivot which holds the lever to the standard. The plows or furrow-openers N are hung upon the cross-bar O, in front of the seed-boxes. The bar is hinged at 5, so that it can be turned up to raise the plows out of the ground. This is done by means of the connecting-rod 6. pivoted to the front edge of the bar O and to the lever 3 above its pivot. Movement, therefore, of the handle of the lever 3 to the rear will lift out the plows and throw the shaft $k$ out of gear with the axle $n$, thus at the same time stopping the feed of the seed and throwing the plows out of the ground.

In rear of the wheels M M, I have provided a shaft, $r$, preferably arranged in slightly-inclined position, and provided with teeth $s$ $s$ in line with the space between the harrows. This is made removable, so that it can be added to the machine when it is used as an ordinary harrow, the teeth $s$ $s$ serving to stir the earth left between the circular harrows.

It will be observed that the seed apparatus may all be removed from the frame of the machine when it is desired to use the machine simply as a harrow. For this purpose I connect the cross-bar which supports the seed-boxes to the side pieces, A A, by easily detaching the connections, and I may remove the axle $n$ by removing the nut 7, which is one of those serving to adjust the bearings of the said axle. The mechanism may then be used as an ordinary harrow. Or, by removing the shaft $r$, the apparatus may be used as a cultivator, working two spaces between the rows at the same time, the machine straddling the row between these spaces.

Instead of removing the seed-boxes and apparatus for working them from the side pieces, A A, I may remove the bolts $b$ and take off the side pieces, A, with all the mechanism attached thereto, and instead of these side pieces I may use a frame, (shown in Fig. 5,) this frame containing simply the foot-bar H, or its equivalent, with the side pieces, A A, on which are set the arms C and other parts of the structure. (Shown in Fig. 2.) This construction adapts the apparatus to be used for three purposes, and to take the place of three machines. It may be used as an ordinary harrow, with the results arising from the rotary system. It may also be used as a seed dropper or planter with the great advantage arising from the rotary-harrow covering, by which the earth is loosely stirred over the seed and the ground left level. It may also be used as a cultivator, the double rotary harrows being separated to straddle the row, and also being made of proper width to work between the rows. The rotary harrows thoroughly eradicate the weeds and stir the soil, and still leave the ground level.

It will be borne in mind that the harrows turn in opposite directions. This is especially favorable when the machine is used as a seed-planter or cultivator. The opposite motions of the harrows counteract each other, and thus tend to keep the machine in direct line. The supporting-wheels M M and the furrow-openers also aid for this purpose. The furrow-openers are raised when the seed-dropping mechanism is thrown out of gear in turning, and therefore do not interfere with that movement.

The whole frame may be removed from the harrows at any time by simply removing the king-bolts.

I have shown in Fig. 6 a substitute for the screw I. This consists of a bolt, I', and spring 9, interposed below the frame F and the arm $c$; but the spring may also be placed around the screw, as shown at 10, Fig. 2. In this case I add a nut, 11, by means of which the tension of the spring may be adjusted. The spring will bear constantly on the block, even when the harrow drops away from the screw.

I claim—

1. In combination, a frame, a pair of rotary harrows straddling the row, fitted to turn between the rows, and pivoted under the frame, mechanism for causing the harrows to rotate, a seed-dropping mechanism located on the frame, and furrow-openers in line therewith, all substantially as described.

2. In combination, a frame, a pair of rotary harrows straddling the row, fitted to turn between the rows, and pivoted under the frame, mechanism for causing the harrows to rotate, a seed-dropping mechanism located on the frame, furrow-openers, and wheels in line with the openers, all substantially as described.

3. In combination, a frame, a pair of rotary harrows pivoted under said frame and fitted to work between the rows, and having space between adapting them to straddle a row, a seed-dropping mechanism and furrow-openers N N on a hinged bar, the rod 6, and hand-lever, all substantially as described.

4. In combination, a frame, a pair of rotary harrows pivoted under said frame, fitted to straddle one row and work between it and the adjacent rows, a seed-dropping mechanism, a shaft, $n$, and wheels M M, and shaft $k$, connected thereto by bevel-gears, and the wrist-pin connecting with the rods of the seed-dropping valves, all substantially as described.

5. In combination, a frame, a pair of rotary harrows pivoted under said frame, fitted to straddle one row and work between it and the adjacent rows, and a shaft, $r$, extending across the rear of the frame, provided with a series of teeth, $s$, set at right angles to each other, all substantially as described.

6. In the described machine, in combination with the axle $n$ and its wheels M M, the shaft $k$, connected to the axle by bevel-gears, and to the seed-valve rods by wrist-pin, the seed-valve mechanism, and the openers on a pivoted bar, and the connections $q$ and 6 to the lever 3, substantially as described.

7. In combination with the frame and harrows, and the seed-dropping mechanism, the vertically-adjustable shaft $n$ and the horizontally-adjustable wheels M M, mounted on said shaft, substantially as described.

8. In combination, the side pieces, A A, suitably connected, harrows B B, arms carrying the wheels G G, the king-bolts, brackets E on the arms, and a frame, F, fixed to said brackets, whereby the harrows are prevented from tipping, all substantially as described.

9. In the described machine, and in combination, the harrows B B, beams A A, king-bolts $b\ b$, arms C C, and supplemental arms $c\ c$, hinged to the arms C C, wheels G G, and connections, as described, between the arms $c\ c$ and the frame F, all as set forth.

10. The detachable structure consisting of the arms C C and supplemental arms $c\ c$, hinged to the arms C, wheels G G, brackets and frame F, attached thereto, and screws I I, in combination with side pieces, A A, and harrows B B, and the king-bolts, all substantially as described.

11. In combination with the frame of a rotary harrow, an axle and supporting-wheels, combined with vertically-adjustable bearings, substantially as described.

12. The combination, with the frame F, secured to the brackets E, which are supported by the arms C, of the screws I, passing through frame F to a block, $i$, on the supplemental arm $c$, and the spring 10 upon the screw bearing on the block $i$, substantially as described.

13. In a double harrow, the rigid bar or frame, the screws I I, the arms $c\ c$, carrying the wheels that bear on the harrows, and the grooved blocks fitted to allow lateral movement of the ends of said screws, the parts being constructed to operate substantially as described.

In testimony whereof I have signed my name to this specification in the presence of two subscribing witnesses.

HALSEY H. MONROE.

Witnesses:
   F. L. MIDDLETON,
   J. B. THOMPSON.